United States Patent [19]
Varga

[11] 3,712,752
[45] Jan. 23, 1973

[54] MACHINE TOOLS

[75] Inventor: John Maximilian Jules Varga, Skircoat Green, England

[73] Assignee: Carding Specialists Co. Limited, Halifax, England

[22] Filed: Nov. 20, 1970

[21] Appl. No.: 91,295

[30] Foreign Application Priority Data

Nov. 25, 1969 Great Britain.....................57,537/69

[52] U.S. Cl. ......................408/42, 408/43, 408/52, 408/72, 90/11 R
[51] Int. Cl.........................B23b 39/16, B23b 47/00
[58] Field of Search..........408/90, 99, 72, 69, 89, 91, 408/88, 42, 43, 50, 52; 90/11 R, 17

[56] References Cited

UNITED STATES PATENTS

3,232,141  2/1966  Swanson et al.........................408/90
3,371,580  3/1968  Barnes et al............................408/89

*Primary Examiner*—Gil Weidenfeld
*Attorney*—Pierce, Scheffler & Parker

[57] ABSTRACT

A machine tool having a work table mounted for pivotal movement about a first axis, a tool holder mounted for pivotal movement about a second axis and means for causing relative movement of the work table and tool holder towards and away from each other. Apart from this advancing movement all other movement is effected by pivoting rather than the use of conventional slideways. The two axes may be parallel and the work table and tool holder also mounted for pivotal movement about second and fourth axes perpendicular to and intersecting the first and third axes respectively. Connecting means are described for moving the work table and tool holder through equal angles in the same sense about their parallel axes. This device is applicable to a plurality of tool holders surrounding a single work table or vice versa.

19 Claims, 8 Drawing Figures

MACHINE TOOLS

This invention relates to machine tools.

Machine tools have in the past invariably included slides for guiding the work pieces and/or or the tools for relative movement along straight line paths. Accurate grinding and finishing of the slide ways is necessary, and hardening of the slides is required. Despite hardening, wear inevitably takes place, particularly with heavier machine tools, and adjustment or replacement of various parts is needed from time to time.

According to the present invention a machine tool comprises a work table, means mounting the work table for pivotal movement about a first axis, a tool holder, means mounting the tool holder for pivotal movement about a second axis spaced from the first axis, means for pivoting the work table and the tool holder about their axes, and means for causing relative movement of the work table and tool holder towards and away from each other.

The invention thus provides a machine tool which does not rely on sliding movement to change the relative positions of the work table and tool holder, but instead uses pivotal movement. By using low friction bearings at the pivots it will be apparent that a machine tool according to the invention will be subject to significantly less wear than a conventional machine tool. Furthermore, there will be no need for the work involved in forming, finishing and hardening the slides.

For most practical purposes the first and second axes will be parallel, but this is not necessary, and non-parallel axes may be useful when working with workpieces of complex shape.

Preferably the means for pivoting the work table and the tool holder are interlocked so that the work table and the tool holder move simultaneously about their axes through identical angles in the same sense of rotation.

As long as the work table and the tool holder are moved through equal angles between working operations, the angle of attack of a tool into a workpiece will always be the same. This interlocking automatically ensures that the necessary angular relationship is maintained. However, separate drives to the work table and the tool holder may be used, the drives being suitably controlled to turn the respective members through the required angles. It may be that different angles of attack of a tool on a workpiece may be desired, for example, in the drilling of two non-parallel bores, and it would then be advantageous to have separate drives which may be controlled to give different angles of attack.

A convenient means for pivoting the work table and the tool holder comprises a connecting rod extending parallel to a line joining, and perpendicular to, the two axes, the connecting rod being pivotally joined at a first point to the work table or to a part movable therewith and at a second point to the tool holder or to a part movable therewith, the first and second points forming, together with coplanar points on the first and second axes, the four corners of a parallelogram, and means for moving the connecting rod longitudinally.

Preferably means are provided for moving the tool holder longitudinally on pivotal movement of the tool holder to maintain substantially constant the distance between the tip of a tool held in the tool holder and the closest point to said tip of a face of a workpiece mounted on the work table, said face being perpendicular to the axis of the tool holder.

This will ensure that whatever the relative angular positions of the work table and tool holder a given longitudinal movement of a tool into a workpiece will always work the workpiece to a constant depth. It also ensures that when, for example, a milling cutter is being used to work the workpiece while the work table and tool holder are being simultaneously pivoted, the resultant cut face will be plane.

In a machine tool according to the invention the axes about which the work table and the tool holder pivot will usually be vertical, to give displacement of the tool laterally of the workpiece in a horizontal plane. Tool movement towards and away from the workpiece is, of course, provided for by the means for causing this relative movement, usually means for driving the tool longitudinally towards and away from the workpiece. Vertical relative displacement of the tool holder and the workpiece may be effected by bodily sliding vertical movement of either of these.

Alternatively, the axes about which the work table and tool holder pivot may be horizontal, to give relative vertical displacement of the two parts, and lateral horizontal displacement may be effected with slides.

Preferably, however, means are provided mounting the work table for further pivotal movement about a third axis intersecting the first axis, means are provided mounting the tool holder for further pivotal movement about a fourth axis intersecting the second axis, and means are provided for pivoting the work table and the holder about the third and fourth axes respectively.

Desirably the first and second axes are parallel, and the second and fourth axes are parallel and are both perpendicular to the first and second axes.

Thus, both relative vertical and relative lateral horizontal movement can be provided for by pivotal mountings rather than by sliding mountings.

The adjustment means for the movement about the third and fourth axes may be similar to that for the adjustment about the first and second axes.

A machine tool according to the invention is not confined to a single tool holder, and in another embodiment of the invention more than one tool holder is provided, the tool holders being spaced around a common work table and each tool holder being pivotally mounted about an axis parallel to and spaced from the axis of the work table, means also being provided for pivoting the work table and the tool holders about their respective axes. The converse arrangement wherein a plurality of work table are spaced around a single tool holder is also possible.

Again the pivoting means may be interlocked and conveniently each tool holder is connected to the work table by a member pivoted at a first point to the work table and at a second point to the tool holder, the two points forming, together with coplanar points on the axes of the work table and the tool holder, the four corners of a parallelogram, and means are provided for longitudinally moving one of said members.

Movement of a single member will thus cause rotation of all the tool holders and of the work table, so enabling a number of operations to be performed simultaneously on a single workpiece, or a number of workpieces to be simultaneously worked.

Embodiments of machine tools according to the invention will now be described in more detail, by way of example only, with reference to the accompanying drawings in which.

Figure 1:
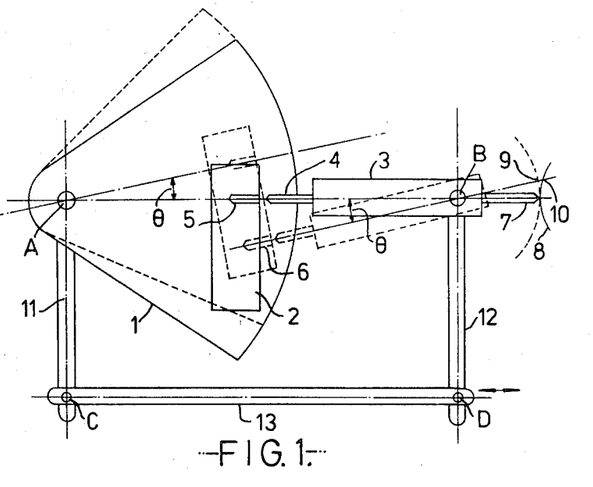
FIG. 1 is a schematic plan of a machine tool illustrating the principles underlying this invention.

Referring now to FIG. 1 this shows a work table 1 having a horizontal surface, the table being mounted for pivotal movement about a first vertical axis A. A work piece 2 may be placed in the table and secured in any known manner, such as by clamps. A tool holder 3 carrying a tool such as a rotary drill 4 is mounted for pivotal movement about a second vertical axis B spaced from the axis A. In the solid line positions of the work table and tool holder, a longitudinal advance of the rotating drill bores a hole 5 in the workpiece. If, after the tool has been withdrawn, the work table is pivoted anticlockwise about axis A through an angle $\theta$, and the tool holder is pivoted anticlockwise about axis B through an angle $\theta$, the parts will take up the positions shown by the broken lines. Longitudinal advance of the rotating drill 4 will now drill a hole 6 in the workpiece. It will be evident that the axes of the holes 4 and 6 will be parallel, and that the holes are laterally spaced in the workpiece. Thus, the relative rotation of the two elements through equal angles in the same sense is the equivalent of a lateral straight line relative sliding motion between the work table and the tool holder.

It will be seen from FIG. 1 that in the dotted line position the tip of the tool 4 lies closer to the surface of the workpiece 2 than it does in the solid line position. Consequently, if the tool were advanced an equal distance in each position the hole 6 would be deeper than the hole 5. Machine tools are often set so that there is a given advance of the tool in each working position, and it is advantageous if the tool of the invention may be operated in the same manner. This may be done by making the tool holder in three parts, a first, tool-carrying part longitudinally movable relative to a second part which in turn is longitudinally movable relative to a carriage which is secured to pivot about the axis B. Normal advance of the tool for working purposes is effected by moving the first part relative to the second part through a distance which may be set as required. The second part has a snout 7 biased into contact with a profiled template 8. As the snout follows the template 8 the second part moves longitudinally in the carriage. As shown in FIG. 1, on rotating from the solid to the dotted line position the second part moves rearwardly in the carriage by the distance between points 9 and 10, which is equal to the distance by which the tool tip would approach the workpiece if both parts merely pivoted about the axes B and A respectively.

Thus, a similar advance of the tool relative to the second part of the tool holder in both solid and broken line positions will result in holes 5 and 6 of equal depth. The shape of the profiled template can readily be designed to give required movement, and the template may be interchangeable so that different movements may be obtained if desired.

It will be apparent that separate drive means may be provided for pivoting the work table and the tool holder about their axes. The drive means may be interlocked to ensure that both elements rotate through the same angle, and a simple interlocking system utilizing a single drive means is shown in FIG. 1. This comprises levers 11 and 12 rigidly secured to the work table and tool holder respectively, and joined by a connecting rod 13 pivoted at a first point to lever 11 about a vertical axis C, and pivoted at a second point to lever 12 about a vertical axis D. The connecting rod 13 extends parallel to a line transverse to and joining axes A and B, and the distances A-C and B-D are made equal. A B C D is thus a parallelogram and any longitudinal movement of the connecting rod 13 will thus cause rotation of the work table and tool holder through equal angles in the same sense of rotation about axes A and B. Movement of the connecting rod may be effected manually, by hydraulic or pneumatic means or by an electric motor.

Figure 2:
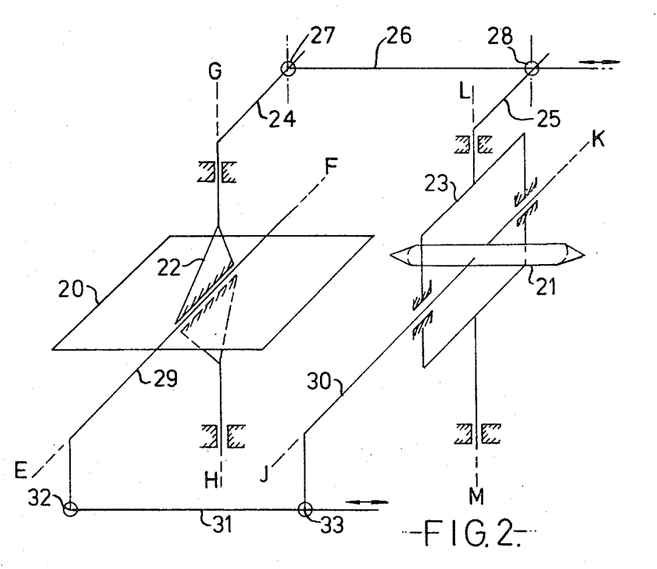
FIG. 2 is a schematic perspective view illustrating these principles further.
Figure 3:
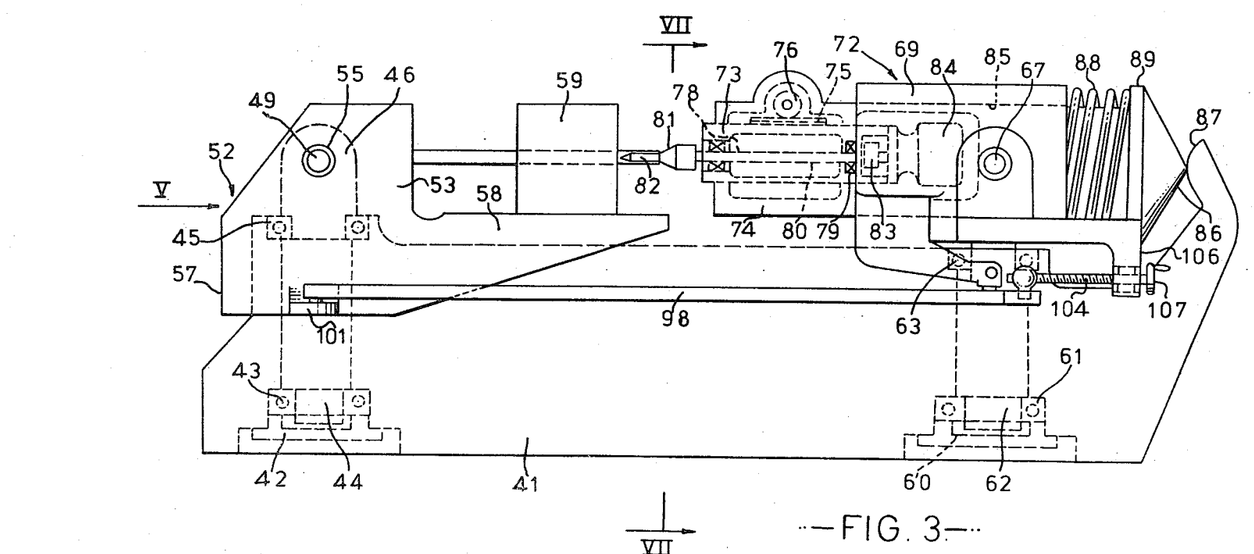
FIG. 3 is a side elevation of a first embodiment of a machine tool according to the invention.
Figure 4:
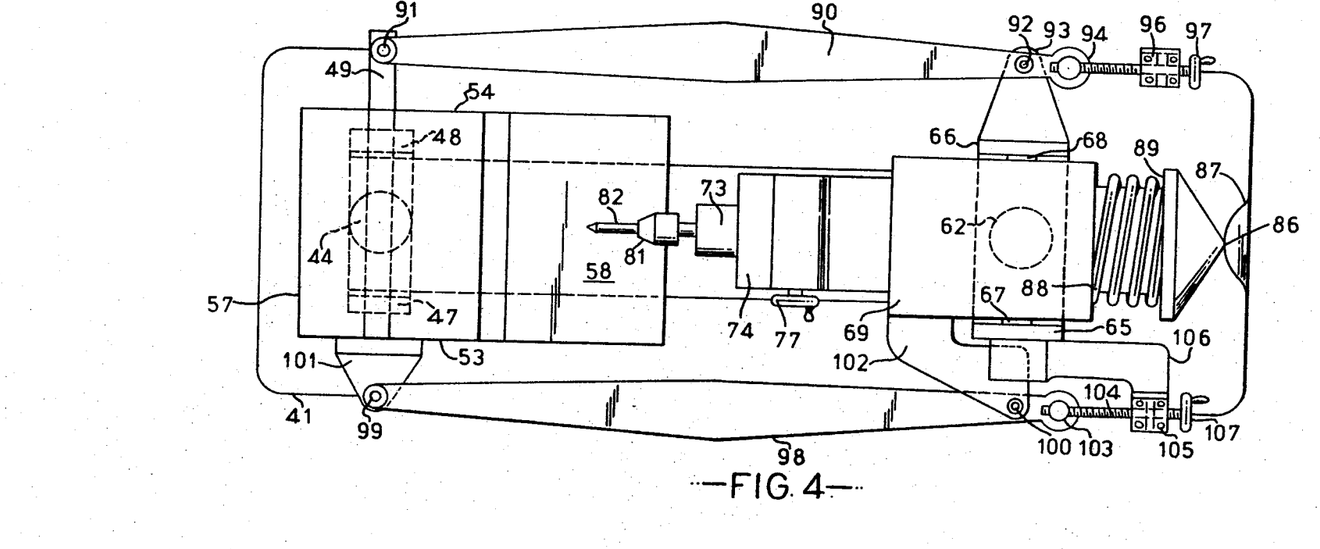
FIG. 4 is a plan view of the machine tool shown in FIG. 3.
Figure 5:
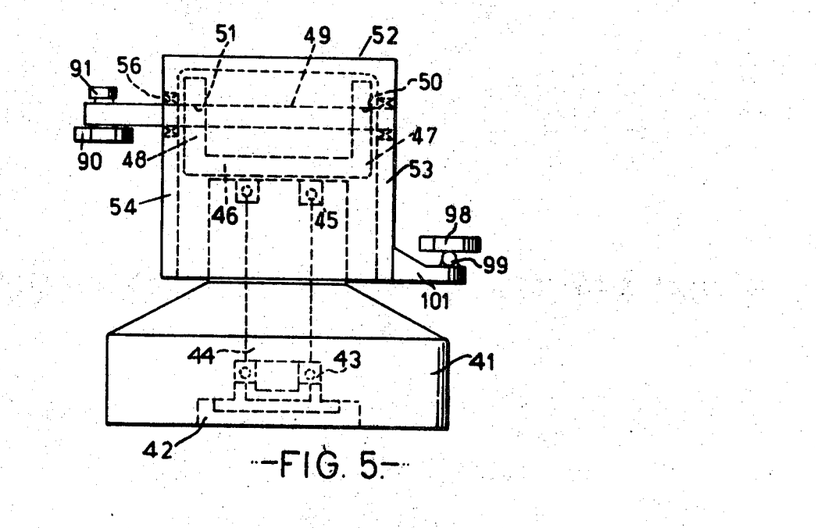
FIG. 5 is an end elevation in the direction of the arrow V of FIG. 3.
Figure 6:
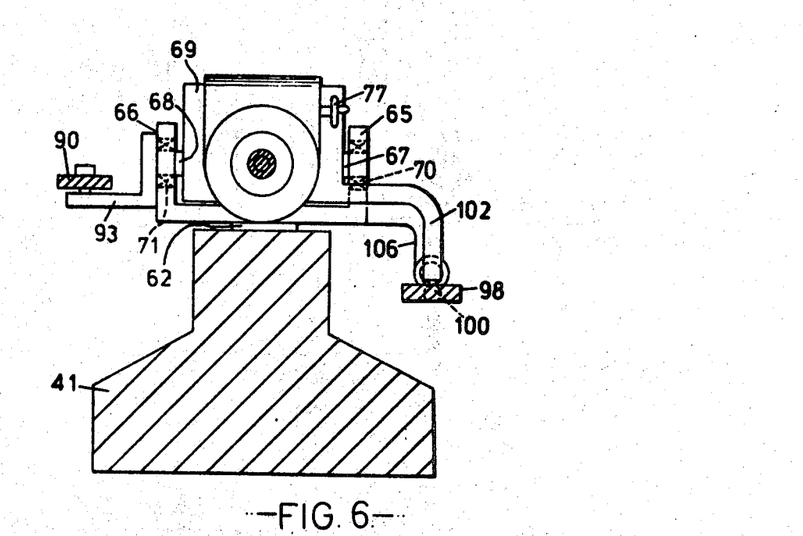
FIG. 6 is a partial section on line VI—VI of FIG. 3.

FIG. 1 shows a machine tool effecting relative movement in a horizontal plane only. However, the principle of the invention may be applied to give relative movement in both horizontal and vertical planes. Referring now to FIG. 2 this shows a work table 20 and a tool holder 21. The work table 20 is pivotally mounted about a horizontal axis E-F in a mount 22 which is pivotally mounted about a vertical axis G-H. The tool holder 21 is pivotally mounted about a horizontal axis J—K in a mount 23 which is pivotally mounted about a vertical axis L-M. Levers 24 and 25 are secured respectively to the mounts 22 and 23, and a connecting rod 26 is pivoted at 27 and 28 to the levers 24 and 25 about vertical axes. Longitudinal movement of the connecting rod 26 will pivot the mounts 22 and 23 and thus the work table and tool holder about axes G-H and L-M, so giving relative lateral horizontal movement of the work table and tool holder.

Levers 29 and 30 are secured respectively to the work table and tool holder, and a connecting rod 31 is pivoted at 32 and 33 to the levers 29 and 30 by universal or ball joints. Longitudinal movement of the connecting rod 31 will pivot the work table and tool holder about the horizontal axes E-F and J-K, so giving relative vertical movement of the work table and tool holder.

FIGS. 3 to 6 show a practical embodiment of a machine tool employing the principles illustrated in FIG. 2. The machine tool includes a base 41, towards one end of which is secured a mount 42 for a bearing 43. A vertical shaft 44 is rotatably mounted by the bearing 43, and is further supported by an upper bearing 45 so that the shaft axis is maintained truly vertical. The upper end of the shaft 44 carries a clevis 46 having parallel arms 47 and 48. A second shaft 49 passes through aligned bores 50 and 51 in the arms 47 and 48. A work table shown generally as 52 has two side plates 53 and 54 which are mounted by way of bearings 55 and 56 on the shaft 49. The side plates of the work table hang down to opposite sides of the base, and the work table also includes an end plate 57 and a receiving surface 58 for a workpiece 59. The lower face of the receiving surface is spaced from the upper surface of the base 41. Suitable clamps or other means are provided for securing the workpiece to the work table.

At the opposite end of the machine tool the base 41 carries a mount 60 for bearing 61. A vertical shaft 62 is rotatably mounted by the bearing 61, and is further supported by an upper bearing 63 so that the shaft axis is maintained truly vertical. The upper end of the shaft 62 carries a clevis 64 having parallel arms 65 and 66. Stub shafts 67 and 68 secured to opposite sides of a carriage 69 are mounted in bearings 70 and 71 respectively in aligned bores in the arms 65 and 66.

The carriage 69 forms one part of a tool holder shown generally as 72. A first part 73 of the tool holder is mounted for longitudinal sliding movement in a second part 74 of the tool holder. The first part may be moved relative to the second part by way of a rack 75 on the first part engaged with a pinion 76 journalled on the second part and rotatable by a hand wheel 77. The first part 73 has bearings 78 and 79 supporting for rotation a spindle 80 having a chuck 81 in which a tool 82 may be secured. The opposite end of the spindle is connected by a flexible coupling 83 to a flange mounted electric motor 84 mounted on the first part 73 to move therewith.

The second part 74 of the tool holder is slidably mounted for longitudinal movement in a bore 85 of the carriage 69. The end of the second part 74 opposite to the tool ends in a snout 86 bearing against a profiled template 87 forming part of the base 41. A compression spring 88 acting between the carriage 69 and a flange 89 on the second part 74 biases the snout 86 into engagement with the template 87.

To one side of the base there is a first connecting rod 90, pivotally connected about vertical pivot axes 91 and 92 respectively to one end of shaft 49 and to a lug 93 secured to the clevis 64. The four points where a horizontal plane intersects the axes of vertical shafts 44 and 62 and the vertical pivot axes 91 and 92 form the corners of a parallelogram. One end of the connecting rod 90 has a bush 94 pivoted thereto, the bush having a threaded part with which a threaded shaft 95 engages. The shaft 95 is journalled in a bush 96 pivotally mounted on the base 41 and is rotatable by a handwheel 97. The two bushes 94 and 96 are self-aligning.

To the opposite side of the base lies a second connecting rod 98, pivotally connected by ball pivots 99 and 100 respectively to a lug 101 secured to the work table 52 and to an arm 102 extending from the carriage 69. The ball pivots 99 and 100 allow pivotal movement about both vertical and horizontal axes. The four points where a horizontal plane intersects the axes of shafts 44 and 62 and the vertical pivot axes of ball pivots 99 and 100 form the four corners of a parallelogram. The four points where a vertical plane intersects the axes of shaft 49, stub shafts 67 and 68 and the horizontal pivot axes of ball pivots 99 and 100 form the four corners of a further parallelogram.

One end of the connecting rod 98 has a bush 103 pivoted thereto, the bush having a threaded part with which a threaded shaft 104 engages. The shaft 104 is journalled in a bush 105 pivotally mounted on an arm 106 secured to the clevis 64 and is rotatable by a handwheel 107. The two bushes 103 and 105 are self-aligning.

Operation of the machine tool will readily be apparent. Adjustment of the threaded shaft 95 by rotating the handwheel 97 will move the connecting rod 90 longitudinally to pivot the clevis members 46 and 64 about the axes of the vertical shafts 44 and 62. The work table and the tool holder will thus pivot through equal angles in the same senses of rotation as explained with reference to FIGS. 1 and 2. The self-aligning bushes 94 and 96 will prevent any locking of the threaded shaft 95. The connecting rod 98 and its adjustment system will of course move simultaneously with the work table and tool holder, this being allowed by the ball pivots 99 and 100 and the parallel arrangement of the connecting rod 98 to the center line of the machine tool.

Adjustment of the threaded shaft 104 by rotating the handwheel 107 will move the connecting rod 98 longitudinally to pivot the work table about shaft 49 and to pivot the carriage 62 of the tool holder about the stub shafts 67 and 68. The work table and the tool holder will thus move through equal angles in a vertical plane in the same senses of rotation, as explained with reference to FIG. 2.

During any adjustment the snout 86 of the second part of the tool holder is forced to follow the profiled template 87 by the spring 88 so that the tip of the tool is maintained a constant distance from the workpiece for any combination of movement of the work table and tool holder. Driving of the tool to and from the workpiece is controlled by handwheel 77, and the motor 84 rotates the tool to work the workpiece.

While manual operation of the machine tool by handwheels has been described it will be understood that the machine tool may be automated, and that hydraulic, pneumatic or electric power may be used for driving the various parts.

Figure 7:
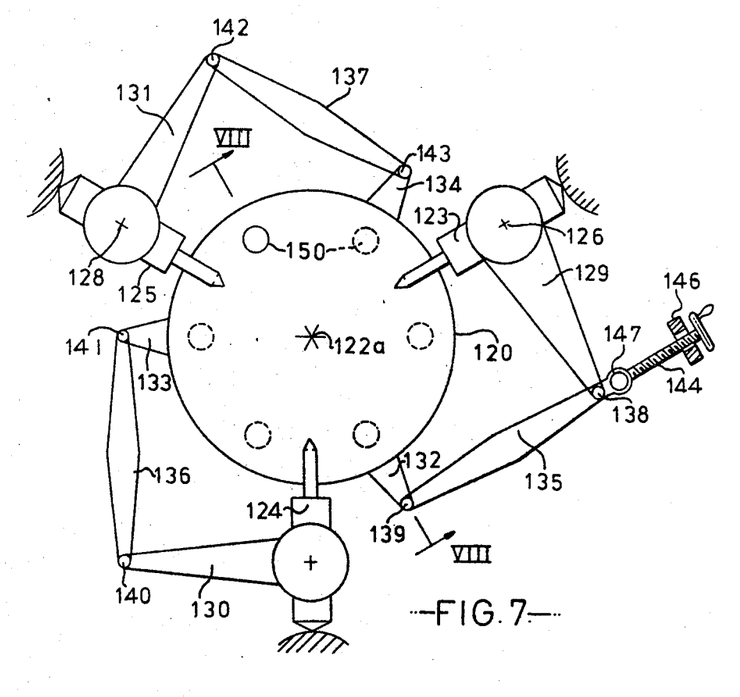
FIG. 7 is a schematic plan view of a second embodiment of machine tool according to the invention.
Figure 8:
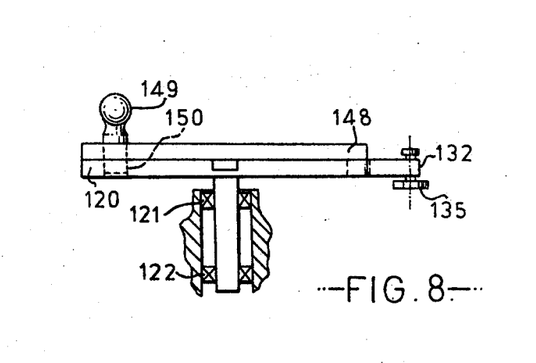
FIG. 8 is a part section on the line VIII—VIII of FIG. 7.

FIGS. 7 and 8 show schematically a further embodiment of machine tool according to the invention. This comprises a work table 120 having a spindle mounted in bearings 121 and 122 for pivotal movement about a vertical axis 122a. Three tool holders 123, 124 and 125, which may each be of the general form shown in FIGS. 3 to 6, are pivotally mounted about vertical axes 126 to 128 respectively. Secured to each tool holder is a lever 129 to 131 respectively. The work table has three radially extending lugs 132 to 134. A connecting rod 135 is pivoted about vertical pivot axes 138 and 139 to the lever 129 and lug 132 respectively. Similar connecting rods 136 and 137 are similarly connected to lever 130 and lug 133 about vertical pivot axes 140 and 141, and to lever 131 and lug 134 about vertical pivot axes 142 and 143 respectively. The points of intersection of the axes 122a, 126, 138 and 139 with a horizontal plane from four corners of a first parallelogram; and corners of second and third parallelograms are formed by the intersection points with said plane of axes 122a, 127, 140 and 141 and of axes 122a, 128, 142 and 143. Adjusting means comprising a threaded shaft 144 rotatable by a handwheel 145 and journalled in a bush 146 self-aligning with a bush 147 on the connecting rod 135 are provided. It will readily be seen that longitudinal movement of the connecting rod 135 will pivot the work table about axis 122a and will pivot all three tool holders about axes 126 to 128, all through equal angles in the same sense. The work table has a turntable top 148 which may be locked in any one of a number of angular positions relative to the base by a locking plunger 149 engageable with holes 150 in the base.

This embodiment may be used for performing three working operations simultaneously on a single workpiece, or for working three separate workpieces simultaneously. The turntable top makes it possible to load the work table with further workpiece while one set of workpieces on the top are being worked. When working is completed a single rotation of the top to a different index position will present the new workpieces to the tools, and move the worked members to a position where they may be removed from the worktable. The indexing facility may alternatively be used to change the angle of a workpiece relative to the tool holder.

In a further modification the work table may carry a headstock rotatably mounted relative to the work table about an axis perpendicular to the axis of the tool. The tool will then be a stationary rather than a rotating tool and it will be evident that the machine tool can then function in a manner equivalent to a lathe. In this case only pivotal movement of the work table and tool holder about vertical axes will be necessary.

What we claim is:

1. A machine tool comprising a work table, means mounting said work table for pivotal movement about a first axis, a tool holder, means mounting said tool holder for pivotal movement about a second axis spaced from and parallel to said first axis, means for pivoting said work table and said tool holder about their respective axes through substantially identical angles in the same sense of rotation, and means for causing relative movement of said work table and said tool holder towards and away from each other.

2. A machine tool as claimed in claim 1 and further comprising at least two tool holders, said tool holders being spaced around said work table and each said tool holder being pivotally mounted about an axis parallel to and spaced from said axis of said work table, and means for pivoting said at least two tool holders about their respective axes.

3. A machine tool as claimed in claim 1 wherein said means for pivoting said work table and said tool holder comprise a connecting rod extending parallel to a line joining, and perpendicular to said two axes, a first pivot joint pivotally connecting said connecting rod at a first joint to said work table, a second pivot joint pivotally connecting said connecting rod at a second point to said tool holder, said first and second points forming, together with coplanar points on said first and second axes, the four corners of a parallelogram, and means for moving said connecting rod longitudinally.

4. A machine tool as claimed in claim 1 and including means for moving said tool holder longitudinally on pivotal movement of said tool holder to maintain substantially constant the distance between the tip of a tool held in said tool holder and the closest point to said tip of a face of a workpiece mounted on said work table, said face being perpendicular to the longitudinal axis of said tool holder.

5. A machine tool as claimed in claim 1 wherein said tool holder comprises a first, tool-carrying part, a second part and a carriage, said first part being longitudinally movable relative to said second part and projecting from a first end of said second part; said second part being mounted for longitudinal movement in said carriage and said carriage being connected to said pivotal mounting means; and a second end of said second part bears against a profiled template secured to a base of said machine tool and shaped to cause said second part to move longitudinally in said carriage on pivotal movement of said tool holder.

6. A machine tool as claimed in claim 6 including an electric motor mounted on said first part of said tool holder, a spindle journalled in said first part, and a driving connection between said electric motor and said spindle.

7. A machine tool as claimed in claim 1 and including means mounting said work table for further pivotal movement about a third axis intersecting said first axis, means mounting said tool holder for further pivotal movement about a fourth axis intersecting said second axis, and means for pivoting said work table and said tool holder about said third and fourth axes respectively.

8. A machine tool as claimed in claim 7 wherein said first and second axes are parallel, and said third and fourth axes are parallel and are both perpendicular to said first and second axes.

9. A machine tool as claimed in claim 8 including interlocking means interlocking the pivoting of said work table and said tool holder about said third and fourth axes so that said work table and said tool holder mover simultaneously about said third and fourth axes through identical angles in the same sense of rotation.

10. A machine tool as claimed in claim 8 wherein said means for pivoting said work table and said tool holder about said third and fourth axes comprise a second connecting rod extending parallel to a line joining, and perpendicular to, said third and fourth axes, a third pivot joint pivotally connecting said second connecting rod at a third point to said work table, a fourth pivot joint pivotally connecting said second connecting rod at a fourth point to said tool holder, said third and fourth points forming, together with coplanar points on said third and fourth axes, the four corners of a further parallelogram, and means for moving said second connecting rod longitudinally.

11. A machine tool as claimed in claim 10 wherein said means for moving said tool holder longitudinally are effective to produce such longitudinal movement for any combination of pivotal movement of said tool holder about said second and fourth axes.

12. A machine tool as claimed in claim 5 wherein said profiled template is shaped to produce the desired longitudinal movement of said tool holder for any combination of pivotal movement of said tool holder about said second and fourth axes.

13. A machine tool comprising a fixed base; a vertically extending first spindle journalled on said base for pivotal movement about a vertical first axis; a vertically extending second spindle journalled on said base for pivotal movement about a vertical second axis spaced from said first axis; a first clevis member secured to an upper end of said first spindle; a work table pivotally mounted on said first clevis member about a horizontal third axis intersecting said first axis; a second clevis member secured to an upper end of said second spindle; a tool holder pivotally mounted on said second clevis member about a horizontal fourth axis intersecting said second axis; a first connecting rod joined at a first point to said first clevis by a first vertical pivot joint and joined at a second point to said second clevis by a second vertical pivot joint, said first and second points forming, together with coplanar points on said first and second axes, the four corners of a first parallelogram; a second connecting rod joined at a third point to said work table by a first ball pivot joint and joined at a fourth point to said tool holder by a second ball pivot joint, said third and fourth points forming, together with coplanar points on said first and second axes, the four corners of a second parallelogram, and said third and fourth points also forming, together with coplanar points on said third and fourth axes, the four corners of a third parallelogram, the distance between the point of intersection of said first and third axes and the point of intersection of said second and fourth axes being equal to the distance between said first and second points and equal to the distance between said third and fourth points; means for moving said first connecting rod longitudinally, and means for moving said second connecting rod longitudinally.

14. A machine tool as claimed in claim 13 wherein said tool holder comprises a first, tool-carrying part, a second part and a carriage, said first part being longitudinally movable relative to said second part and projecting from a first end of said second part; said second part being mounted for longitudinal movement in said carriage and said carriage being pivotally mounted on said second clevis; and a second end of said second part bears against a profiled template secured to a base of said machine tool and shaped to cause said second part of said tool holder to move longitudinally in said carriage on any combination of pivotal movement of said tool holder about said third and fourth axes.

15. A machine tool as claimed in claim 14 including a flange on said second part of said tool holder, and a compression spring acting between said carriage and said flange to bias said second part into engagement with said profiled template.

16. A machine tool as claimed in claim 2 including interlocking means interlocking the pivoting of said work table and said tool holders so that as said work table is moved through a given angle in a given sense of rotation, all said tool holders are moved through an equal angle in the same sense of rotation.

17. A machine tool as claimed in claim 16 and including, in association with each said tool holder, a member pivotally connected at a first point to said work table and pivotally connected at a second point to said tool holder, said two points forming, together with coplanar points on said axes of said work table and said tool holder, the four corners of a parallelogram, and means are provided for longitudinally moving one of said members.

18. A machine tool as claimed in claim 2 and including means for moving each said tool holder longitudinally on pivotal movement of said tool holder to maintain substantially constant the distance between the tip of a tool held in said tool holder and the closest point to said tip of a face of a workpiece mounted on said work table, said face being perpendicular to said axis of said tool holder.

19. A machine tool as claimed in claim 1 wherein said work table comprises a base, a turntable top rotatable relative to a base, and means locking said top and said base in any selected one of a number of relative angular positions.

* * * * *